(12) United States Patent
Park et al.

(10) Patent No.: US 12,739,826 B2
(45) Date of Patent: Sep. 15, 2026

(54) METHOD AND APPARATUS FOR DYNAMICALLY CHANGING UPLINK TRANSMISSION CONFIGURATION IN WIRELESS COMMUNICATION SYSTEM

(71) Applicant: LG Electronics Inc., Seoul (KR)

(72) Inventors: Haewook Park, Seoul (KR); Jiwon Kang, Seoul (KR); Seongwon Go, Seoul (KR)

(73) Assignee: LG Electronics Inc., Seoul (KR)

( * ) Notice: Subject to any disclaimer, the term of this patent is extended or adjusted under 35 U.S.C. 154(b) by 303 days.

(21) Appl. No.: 18/572,029

(22) PCT Filed: Jul. 12, 2022

(86) PCT No.: PCT/KR2022/010081
§ 371 (c)(1),
(2) Date: Dec. 19, 2023

(87) PCT Pub. No.: WO2023/287146
PCT Pub. Date: Jan. 19, 2023

(65) Prior Publication Data

US 2024/0284451 A1 Aug. 22, 2024

(30) Foreign Application Priority Data

Jul. 14, 2021 (KR) ........................ 10-2021-0091923

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0053* (2013.01); *H04W 72/0457* (2023.01); *H04W 72/231* (2023.01)

(58) Field of Classification Search
CPC ......... H04W 72/1268; H04W 72/0457; H04W 72/231; H04L 5/0053
See application file for complete search history.

(56) References Cited

U.S. PATENT DOCUMENTS

2018/0324715 A1* 11/2018 Ryoo .................... H04W 72/20
2020/0351127 A1* 11/2020 Yokomakura ......... H04L 5/0055
(Continued)

FOREIGN PATENT DOCUMENTS

EP 3522471 A1 8/2019
KR 10-2262728 6/2020
WO WO 2021/047973 3/2021

OTHER PUBLICATIONS

European Search Report in European Appln. No. 22842408.1, mailed on May 27, 2025, 10 pages.
(Continued)

*Primary Examiner* — Derrick V Rose
(74) *Attorney, Agent, or Firm* — Fish & Richardson P.C.

(57) ABSTRACT

Disclosed are a method performed by a terminal in a wireless communication system, according to one embodiment of the present disclosure, comprises the steps of: receiving, from a network, configuration information for a first transmission configuration and a second transmission configuration for uplink transmission; receiving, from the network, indication information for either the first or second transmission configuration; and performing the uplink transmission on the basis of the transmission configuration indicated by the indication information, wherein an application time of the indicated transmission configuration is based on at least one of a reception time of the indication information and a transmission time of an acknowledgment (ACK/NACK) for the indication information, and the first and second transmission configurations may be associated with
(Continued)

a first type of waveform and a second type of waveform, respectively.

7 Claims, 10 Drawing Sheets

(51) Int. Cl.
*H04W 72/0457* (2023.01)
*H04W 72/231* (2023.01)

(56) References Cited

U.S. PATENT DOCUMENTS

2021/0050886 A1 2/2021 Lee et al.
2023/0283436 A1 * 9/2023 Bhamri ............... H04L 27/0008 370/329

OTHER PUBLICATIONS

Apple Inc., "A Discussion on Physical Layer Design for NR between 52.6GHz and 71 GHz," 3GPP TSG RAN WG1 #103-e, R1-2008457, e-Meeting, Oct. 26-Nov. 13, 2020, 32 pages.
International Search Report and Written Opinion in Appln. No. PCT/KR2022/010081, mailed on Oct. 19, 2022, 6 pages (with English translation).
Moderator (Samsung), "Feature lead summary#1 for Physical layer structure for sidelink," 3GPP TSG RAN WG1 #105-e, R1-2106088, e-Meeting, May 10-27, 2021, 31 pages.

* cited by examiner

FIG.6

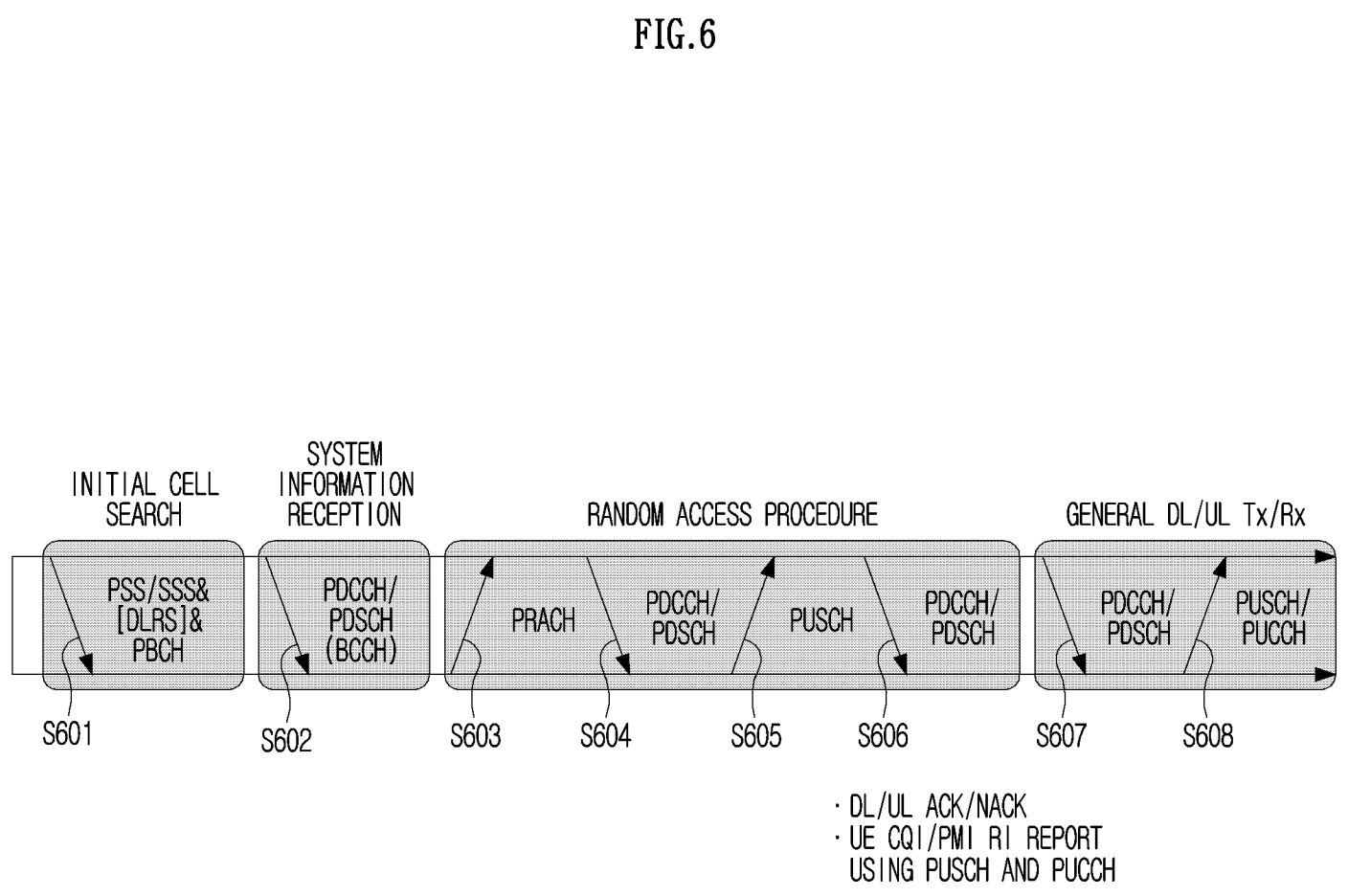

INITIAL CELL SEARCH
PSS/SSS& [DLRS]& PBCH
S601
SYSTEM INFORMATION RECEPTION
PDCCH/ PDSCH (BCCH)
S602
RANDOM ACCESS PROCEDURE
PRACH
S603
PDCCH/ PDSCH
S604
PUSCH
S605
PDCCH/ PDSCH
S606
GENERAL DL/UL Tx/Rx
PDCCH/ PDSCH
S607
PUSCH/ PUCCH
S608
· DL/UL ACK/NACK
· UE CQI/PMI RI REPORT USING PUSCH AND PUCCH

METHOD AND APPARATUS FOR DYNAMICALLY CHANGING UPLINK TRANSMISSION CONFIGURATION IN WIRELESS COMMUNICATION SYSTEM

CROSS-REFERENCE TO RELATED APPLICATIONS

This application is a National Stage application under 35 U.S.C. § 371 of International Application No. PCT/KR2022/010081, filed on Jul. 12, 2022, which claims the benefit of Korean Application No. 10-2021-0091923, filed on Jul. 14, 2021. The disclosures of the prior applications are incorporated by reference in their entirety.

TECHNICAL FIELD

The present disclosure relates to a wireless communication system, and in more detail, relates to a method and a device for dynamically changing an uplink transmission configuration in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

Technical Problem

A technical problem of the present disclosure is to provide a method and a device for dynamically changing an uplink transmission configuration in a wireless communication system.

An additional technical problem of the present disclosure is to provide a method and a device for performing uplink transmission based on a plurality of waveform-related configurations and a dynamic change indication between them in a wireless communication system.

An additional technical problem of the present disclosure is to provide a method and a device for performing uplink transmission based on timing related to a dynamic change indication for an uplink transmission configuration in a wireless communication system.

The technical objects to be achieved by the present disclosure are not limited to the above-described technical objects, and other technical objects which are not described herein will be clearly understood by those skilled in the pertinent art from the following description.

Technical Solution

A method for performing uplink transmission by a terminal in a wireless communication system according to an aspect of the present disclosure includes receiving from a network configuration information on a first transmission configuration and a second transmission configuration for uplink transmission; receiving from the network indication information on one of the first or second transmission configuration; and performing uplink transmission based on a transmission configuration indicated by the indication information, and an application time of the indicated transmission configuration may be based on at least one of a reception time of the indication information or a transmission time of acknowledgment (ACK/NACK) for the indication information and the first and second transmission configuration may be associated with a first type of waveform and a second type of waveform, respectively.

A method for receiving uplink transmission by a base station in a wireless communication system according to an additional aspect of the present disclosure includes transmitting to a terminal configuration information on a first transmission configuration and a second transmission configuration for uplink transmission; transmitting to the terminal indication information on one of the first or second transmission configuration; and receiving from the terminal uplink transmission based on a transmission configuration indicated by the indication information, and a transmission configuration applied to the uplink transmission may be based on at least one of a reception time of the indication information or a transmission time of acknowledgment (ACK/NACK) for the indication information and the first and second transmission configuration may be associated with a first type of waveform and a second type of waveform, respectively.

Technical Effects

According to the present disclosure, a method and a device for dynamically changing an uplink transmission configuration in a wireless communication system may be provided.

According to the present disclosure, a method and a device for performing uplink transmission based on a plurality of waveform-related configurations and a dynamic change indication between them in a wireless communication system may be provided.

According to the present disclosure, a method and a device for performing uplink transmission based on timing related to a dynamic change indication for an uplink transmission configuration in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

DETAILED DESCRIPTION

Figure 1:
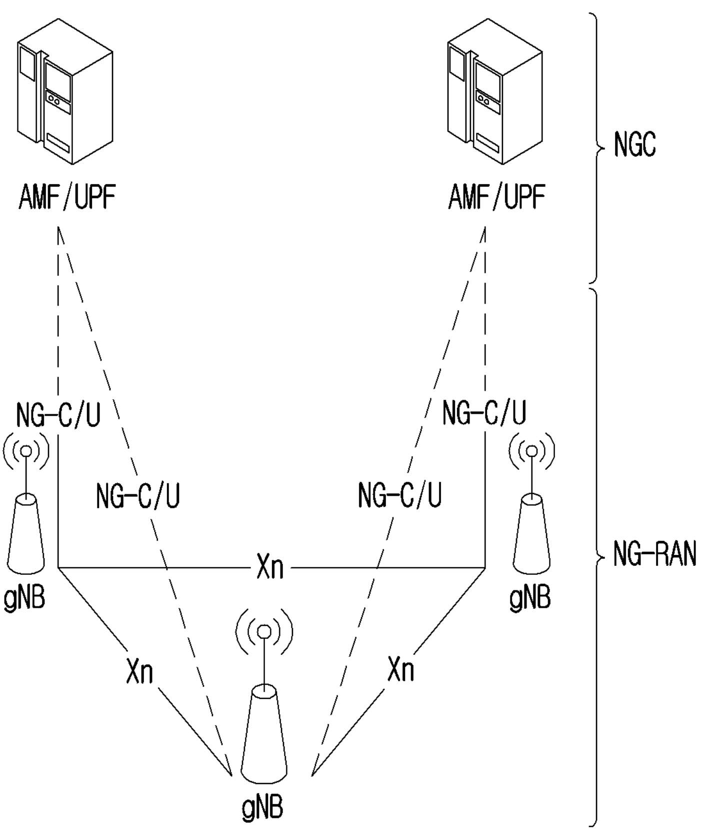
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
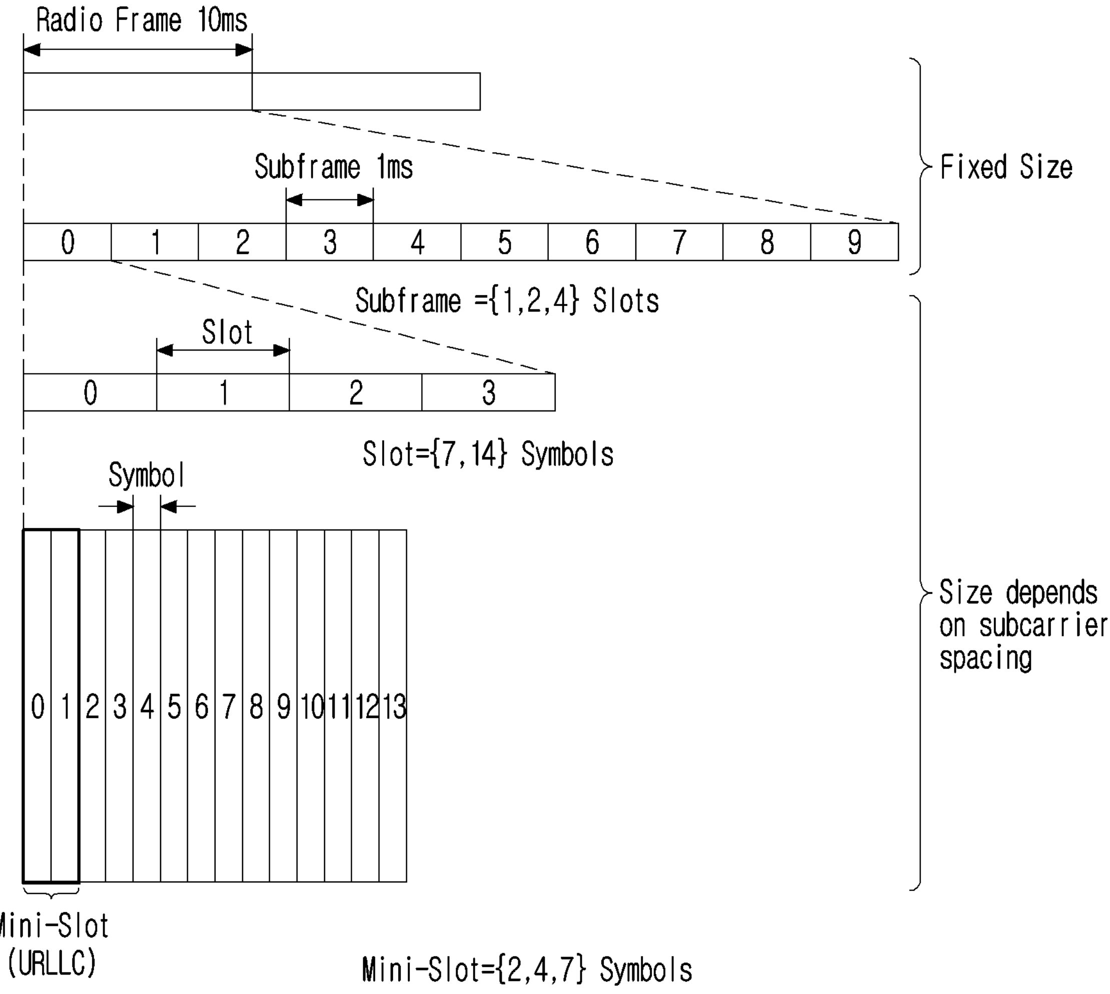
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $$n_s^{\mu} \in \{0, \ldots, N_{slot}^{subframe,\mu}-1\}$$

in a subframe and are numbered in an increasing order of $$n_{s,f}^{\mu} \in \{0, \ldots, N_{slot}^{frame,\mu}-1\}$$

in a radio frame. One slot is configured with $$N_{symb}^{slot}$$

consecutive OFDM symbols and $$N_{symb}^{slot}$$

is determined according to CP. A start of a slot $$n_s^{\mu}$$

in a subframe is temporally arranged with a start of an OFDM symbol $$n_s^{\mu} N_{symb}^{slot}$$

in the same subframe. All terminals may not perform transmission and reception at the same time, which means that all OFDM symbols of a downlink slot or an uplink slot may not be used. Table 3 represents the number of OFDM symbols per slot $$(N_{symb}^{slot}),$$

the number of slots per radio frame $$(N_{slot}^{frame,\mu})$$

and the number of slots per subframe $$(N_{slot}^{subframe,\mu})$$

in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
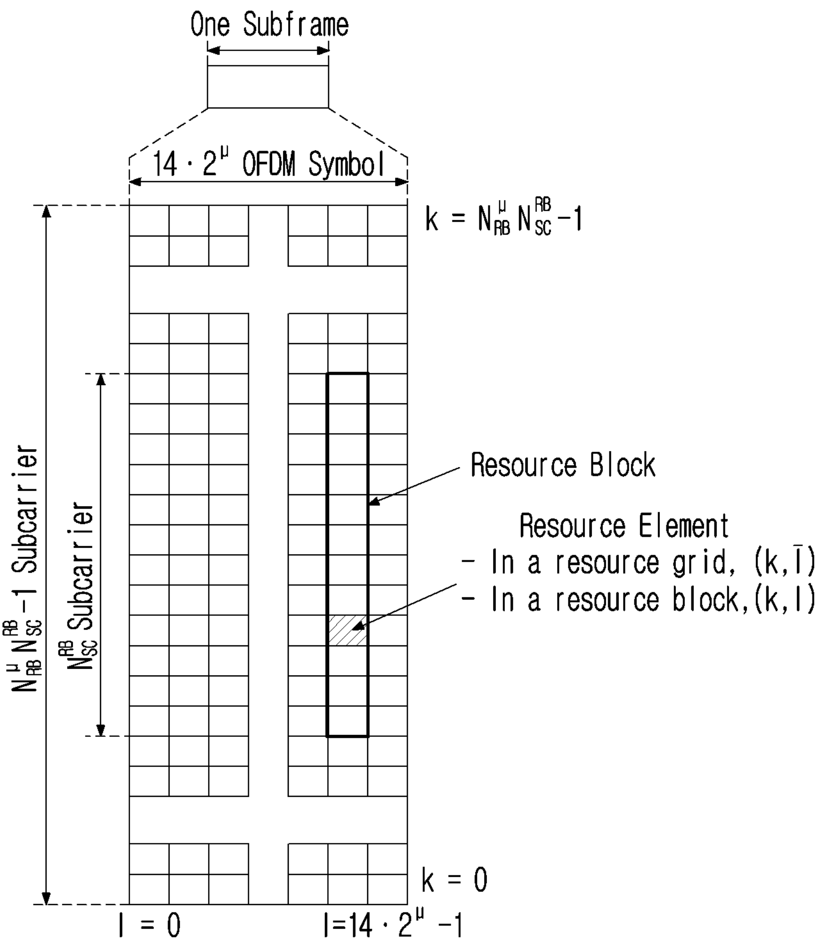
FIG. 3 illustrates a resource grid in a wireless communication system to which the present disclosure may be applied.

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied. In reference to FIG. 3, it is illustratively described that a resource grid is configured with $$N_{RB}^{\mu} N_{sc}^{RB}$$

subcarriers in a frequency domain and one subframe is configured with $14 \cdot 2^{\mu}$ OFDM symbols, but it is not limited thereto. In an NR system, a transmitted signal is described by OFDM symbols of $$2^{\mu} N_{symb}^{(\mu)}$$

and one or more resource grids configured with $$N_{RB}^{\mu} N_{sc}^{RB}$$

subcarriers. Here, $$N_{RB}^{\mu} \le N_{RB}^{max,\mu}.$$

The $$N_{RB}^{max,\mu}$$

represents a maximum transmission bandwidth, which may be different between an uplink and a downlink as well as between numerologies. In this case, one resource grid may be configured per μ and antenna port p. Each element of a resource grid for and an antenna port p is referred to as a resource element and is uniquely identified by an index pair (k,l'). Here, $$k = 0, \ldots, N_{RB}^{\mu} N_{sc}^{RB} - 1$$

is an index in a frequency domain and $$1' = 0, \ldots, 2^{\mu} N_{symb}^{(\mu)} - 1$$

refers to a position of a symbol in a subframe. When referring to a resource element in a slot, an index pair (k,l) is used. Here, $$1 = 0, \ldots, N_{symb}^{\mu} - 1.$$

A resource element (k,l') for and an antenna port p corresponds to a complex value, $$a_{k,l'}^{(p,\mu)}.$$

When there is no risk of confusion or when a specific antenna port or numerology is not specified, indexes p and μ may be dropped, whereupon a complex value may be $$a_{k,l'}^{(p)}$$

or $a_{k,l'}$. In addition, a resource block (RB) is defined as $$N_{sc}^{RB} = 12$$

consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $$N_{BWP,i}^{size,\mu} - 1$$

in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} - n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
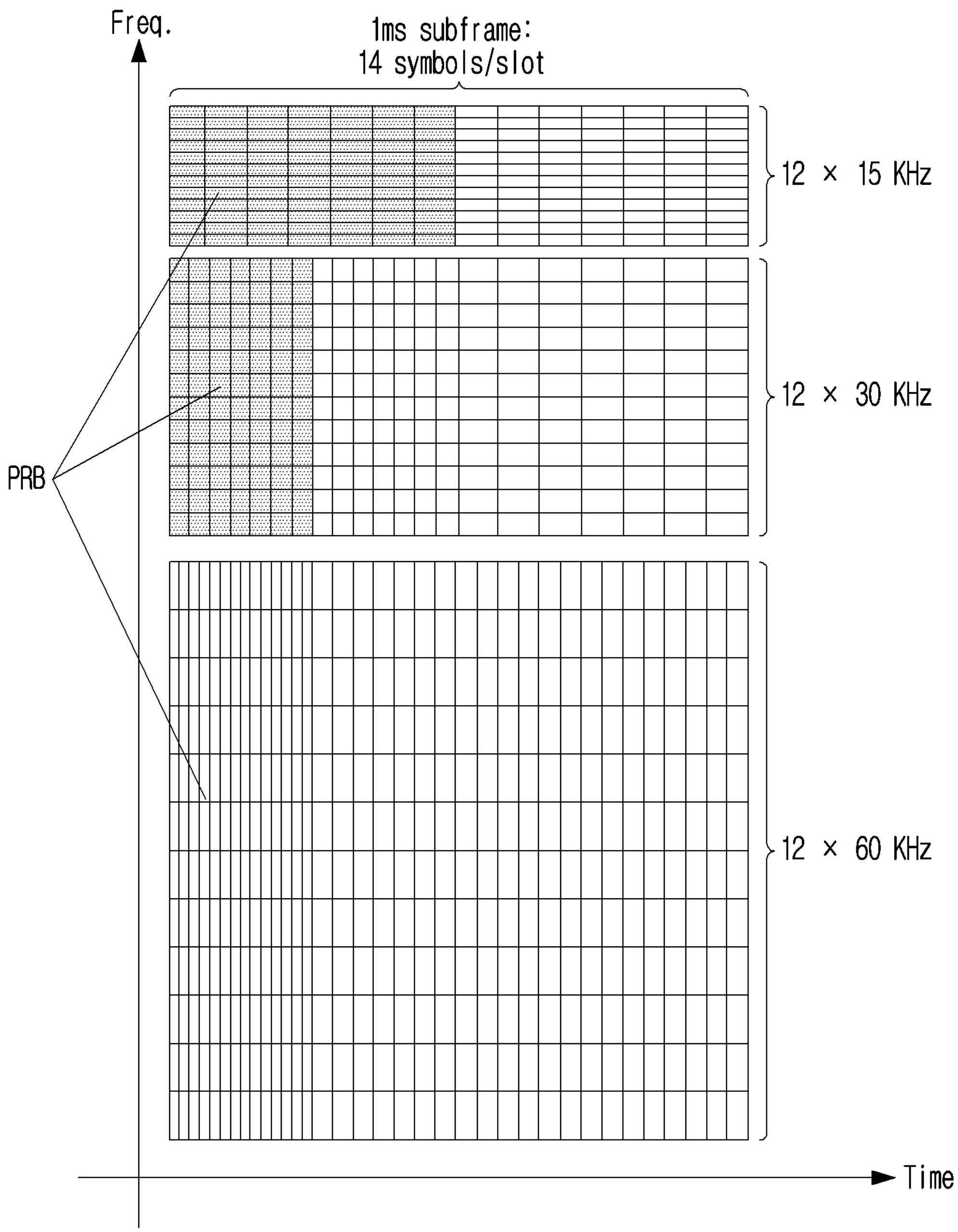
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
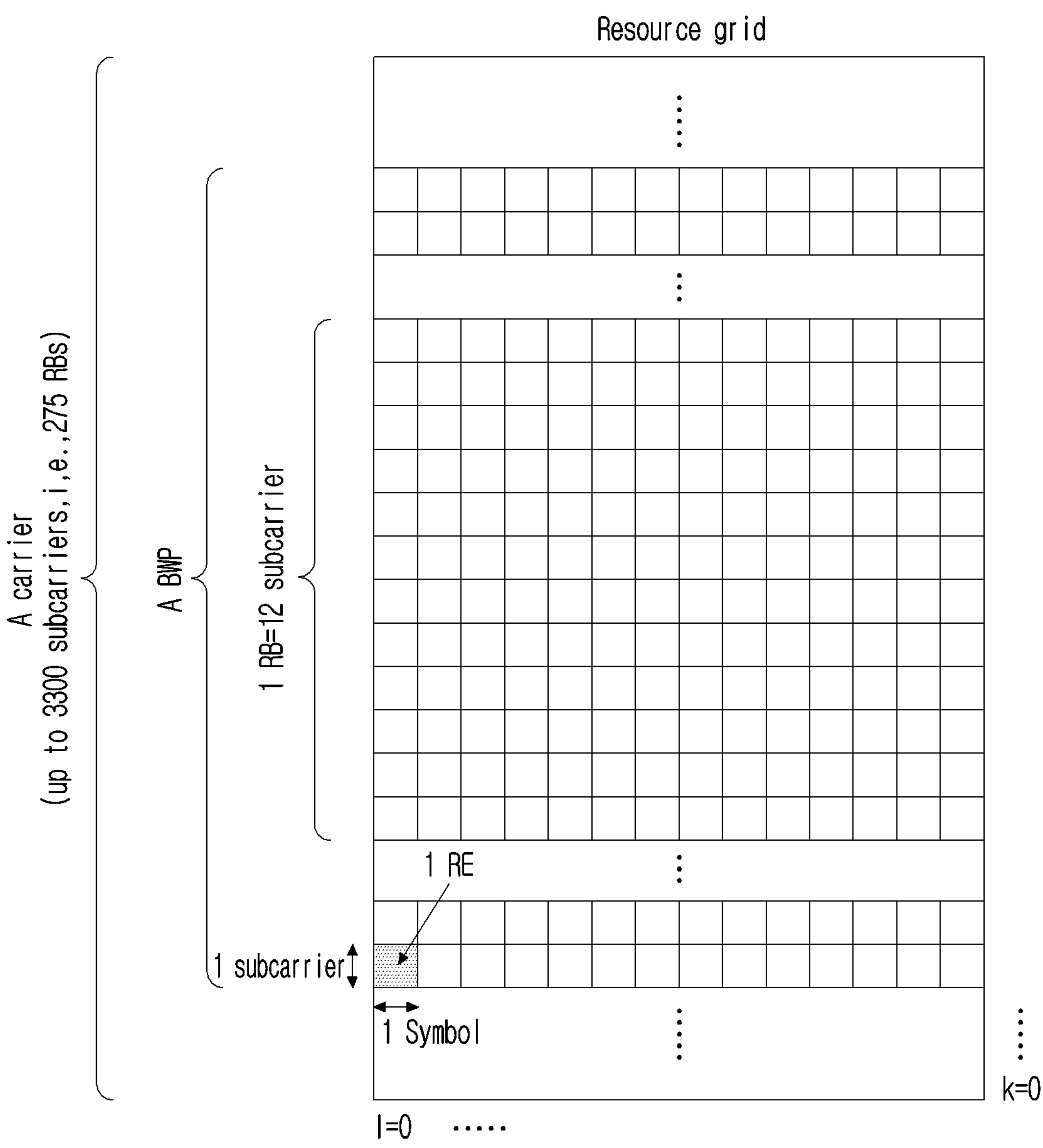
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation and Coding Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted. DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Hereinafter, a method for dynamically changing an uplink transmission configuration according to the present disclosure is described.

For example, in a wireless communication system equipped with multiple antennas/multiple panels, various transmission methods may be defined for uplink transmission. A transmission method may correspond to an uplink waveform generation method. For example, in a NR system, two waveform options, cyclic prefix-OFDM (CP-OFDM) and discrete Fourier transform-spread-OFDM (DFT-s-OFDM), are defined for an uplink. DFT-s-OFDM may be distinguished from CP-OFDM in that transform precoding is applied. In other words, transform precoding may be applied in a form of DFT which distributes information to be transmitted in a frequency domain, and as a result, it may reduce a peak-to-average power ratio (PAPR) of a generated/transmitted signal. For uplink transmission, a DFT-s-OFDM method may be defined for a purpose of fallback.

An uplink transmission configuration may be applied semi-statically by higher layer (e.g., RRC) signaling. For example, in a configuration for a PUSCH, a configuration for configured grant, a configuration for Msg3/MsgA in a random access process, etc., a parameter for whether to apply transform precoding (or which waveform of DFT-s-OFDM and CP-OFDM is applied) may be included. Accordingly, a terminal may operate according to a semi-static configuration for whether to apply transform precoding to uplink channel transmission, and a method of dynamically indicating whether to apply transform precoding to uplink transmission (i.e., dynamically switching a waveform) is not prepared.

In the present disclosure, an uplink transmission configuration includes a configuration for a waveform generation method. As a representative example, a first transmission configuration (e.g., applying transform precoding to an uplink channel) may be associated with a first waveform (e.g., DFT-s-OFDM) and a second transmission configuration (e.g., not applying transform precoding to an uplink channel) may be associated with a second waveform (e.g., CP-OFDM). However, a scope of the present disclosure is not limited thereto, and an association between an uplink transmission configuration and a waveform includes being configured/defined through a variety of other parameters as well as whether to apply transform precoding. In addition, the present disclosure is not limited to the number of uplink transmission configuration candidates being two, and includes, for example, at least three waveform options being configured.

Based thereon, the present disclosure describes a new method of supporting a dynamic change/switching between a plurality of waveforms for uplink transmission.

Uplink transmission may support codebook-based transmission and non-codebook-based transmission. So far, for codebook-based uplink transmission, only single layer transmission is supported for DFT-s-OFDM and up to four layer transmission is supported for CP-OFDM. A DFT-s-OFDM method has a single carrier property, has relatively fewer PAPR problems than a CP-OFDM method and also has an effect of reducing the cost of terminal implementation. Also for DFT-s-OFDM, it is also possible to consider increasing throughput through multi-layer transmission. To this end, a new method for a dynamic change/switching between a plurality of waveforms is required.

Figure 7:
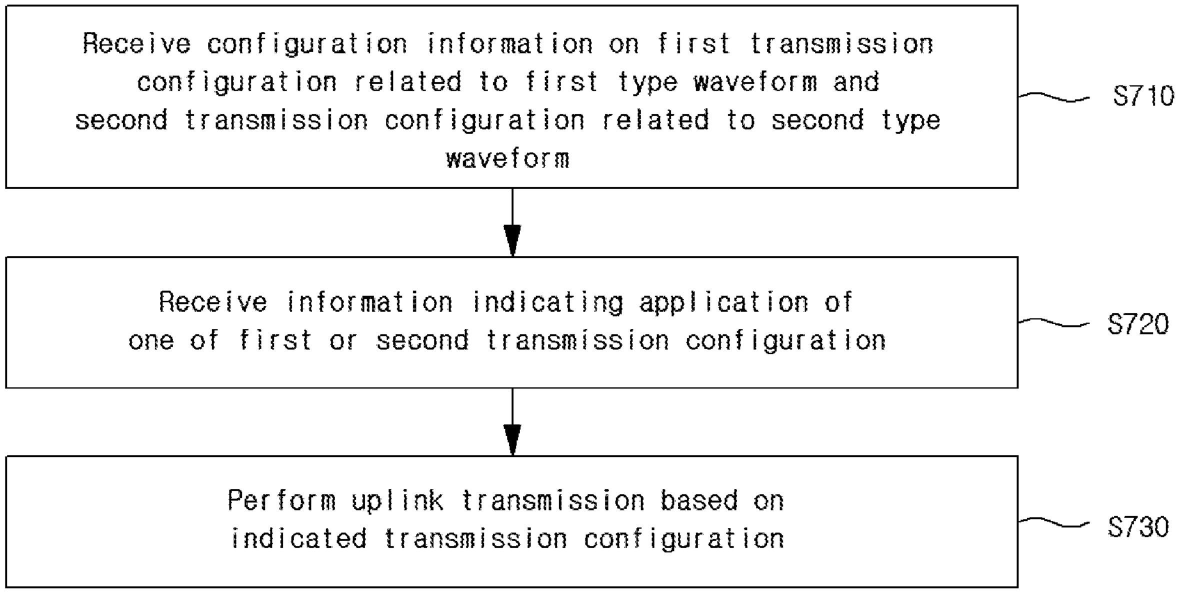
FIG. 7 is a diagram for describing an uplink transmission method of a terminal according to the present disclosure.

FIG. 7 is a diagram for describing an uplink transmission method of a terminal according to the present disclosure.

In S710, a terminal may receive information about a plurality of uplink transmission configurations from a network.

For example, a terminal may receive configuration information on a first transmission configuration (e.g., a configuration for a first type waveform) and a second transmission configuration (e.g., a configuration for a second type waveform). Configuration information on a first transmission configuration and configuration information on a second transmission configuration may be included in one information element or may be included in an individual information element.

For example, information on a plurality of uplink transmission configurations may be received through higher layer (e.g., RRC) signaling. For example, one of a first transmission configuration or a second transmission configuration may be defined as a default transmission configuration. For example, part of a first transmission configuration and a second transmission configuration may be common and the remaining may be configured individually. For example, each transmission configuration may include a power control-related configuration or a power headroom report-related configuration, etc. associated with each type of waveform. For example, a different transmission configuration may be distinguished by a different configuration identifier or waveform type identifier.

In S720, a terminal may receive information indicating application of one of a first uplink transmission configuration or a second uplink transmission configuration from a network.

For example, indication information on an uplink transmission configuration may be provided to a terminal through a MAC-CE (control element) or DCI. For example, DCI indicating a first transmission configuration and DCI indicating a second transmission configuration may be defined as having the same size. For example, a specific field included in corresponding DCI may have a size based on the maximum value of a size for a first transmission configuration and a size for a second transmission configuration. Alternatively, for example, indication information may include BWP indication/switching information. For example, based on whether indication information for an uplink transmission configuration is successfully received/decoded, acknowledgment (ACK/NACK) information may be transmitted.

In S730, a terminal may perform uplink transmission based on an indicated uplink transmission configuration.

For example, a predetermined time when an uplink transmission configuration is applied/changed in S730 may be determined based on a time when indication information for an uplink transmission configuration is received or a time when acknowledgment (ACK/NACK) information for an indication is transmitted in S720. For example, an indicated uplink transmission configuration may be applied after the predetermined number of time units from a reception time of indication information or a transmission time of acknowledgment information. The predetermined number of time units may be predefined (i.e., predefined without signaling between a network and a terminal) or may be preconfigured (i.e., configured through signaling between a network and a terminal) based on a terminal's capability or wireless environment.

For example, application of an uplink transmission configuration based on indication information may be limited to a predetermined time period. After a predetermined time period, a default uplink transmission configuration may be applied.

Figure 8:
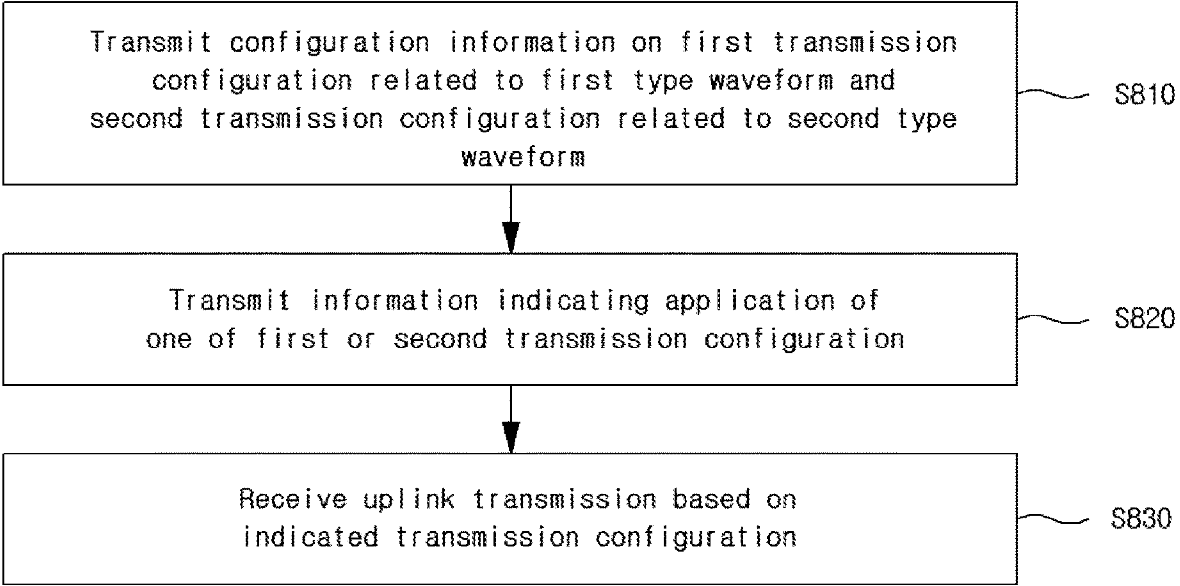
FIG. 8 is a diagram for describing an uplink reception method of a base station according to the present disclosure.

FIG. 8 is a diagram for describing an uplink reception method of a base station according to the present disclosure.

In S810, a base station may transmit configuration information for a plurality of uplink transmission configurations to a terminal.

Since specific details of configuration information for a transmission configuration are the same as a description related to S710 in FIG. 7, an overlapping description is omitted.

In S820, a base station may perform transmission to a terminal indicating application of one of a first uplink transmission configuration or a second uplink transmission configuration.

specific details of indication information for a transmission configuration are the same as a description related to S720 in FIG. 7, an overlapping description is omitted.

In S830, a base station may receive from a terminal uplink transmission based on an indicated uplink transmission configuration.

Since specific details for application of an indicated uplink transmission configuration or a time of uplink transmission based thereon, etc. are the same as a description related to S730 in FIG. 7, an overlapping description is omitted.

Hereinafter, specific examples of the present disclosure are described.

Embodiment 1

This embodiment relates to a method for dynamically indicating an uplink transmission configuration.

For example, it may be assumed that a plurality of uplink transmission configurations (e.g., each transmission configuration is associated with a distinct type of waveform) is preconfigured for a terminal, and one of a plurality of transmission configurations may be dynamically indicated for a terminal. The following description mainly describes an indication for a waveform in an illustrative way among an indication for an uplink transmission configuration and an indication for a waveform, but it may be replaced with an indication for an uplink transmission configuration associated with a corresponding waveform. In addition, an indication for a transmission configuration/a waveform may include a switching indication to a specific transmission configuration/a specific type of waveform, an indication for application of a specific transmission configuration/a specific type of waveform and an indication for activation (or deactivation) of a specific transmission configuration/a specific type of waveform.

For example, a dynamic indication for a transmission configuration/a waveform may be indicated through a MAC-CE.

For example, a dynamic indication for a transmission configuration/a waveform may be indicated based on DCI.

For example, a specific transmission configuration/waveform may be predefined/preconfigured as a default transmission configuration/waveform. In this case, a dynamic indication for a transmission configuration/a waveform may include that a specific transmission configuration/waveform indicated for a predetermined time period is applied.

Embodiment 1-1

Switching for an uplink waveform may be activated or deactivated by using a MAC-CE. A switched (i.e., target) waveform may be a waveform different from a waveform configured/activated before a switching indication (e.g., a source waveform) or may be a specific waveform configured by a base station.

For example, a terminal which received a MAC-CE command indicating activation/deactivation of an uplink transmission configuration may transmit acknowledgment (ACK/NACK) therefor. For example, a MAC-CE may be received in time unit index t0 and ACK/NACK may be transmitted in time unit index t1. For example, a MAC-CE may be received through a PDSCH and a terminal may transmit whether a MAC-CE is received to a network according to a HARQ-ACK feedback operation for a corresponding PDSCH.

Here, a time unit may be a unit having a relative time length based on subcarrier spacing (SCS) such as a symbol, a symbol group, a slot and a slot group or may be an absolute time unit such as ms and us. For example, a time offset between t0 and t1 may be predefined or preconfigured according to a HARQ-ACK operation.

In this case, based on t0, a time when a MAC-CE is received, or based on t1, a time when ACK/NACK for a MAC-CE is transmitted, a switched (or activated) waveform may be applied after X time units. Here, it may be a value including X=0.

Embodiment 1-2

Switching for an uplink waveform may be indicated based on DCI.

For example, a specific field for a waveform change/switching within DCI may be defined and a waveform change/switching may be indicated through a value of a corresponding field. For example, a specific field may be defined as a 1-bit field, and switching to one of two types of waveform (e.g., CP-OFDM and DFT-s-OFDM) may be indicated. If the number of candidate types of an applicable waveform is large, a waveform change/switching field may be defined as having a size of 1 bit or more.

As an additional example, an uplink waveform may be associated with a BWP. For example, a plurality of BWPs configured for a terminal may include at least one BWP associated with a first waveform and at least one BWP associated with a second waveform. Some BWPs may be configured to be associated with both a first waveform and a second waveform (or waveform-common, or unassociated with a waveform).

For example, a first waveform may be associated with a first BWP and a second waveform may be associated with a second BWP. Here, an association between a BWP and a waveform may be predefined or preconfigured. In other words, a dynamic (switching) indication for a waveform may include a BWP (switching) indication. Alternatively, a BWP (switching) indication may include a dynamic (switching) indication for an uplink waveform. For example, according to the existing BWP switching, switching to a waveform associated with a corresponding BWP may be jointly indicated.

For example, an uplink-related configuration (e.g., a PUCCH configuration, a SRS configuration, the number of PUSCH antenna ports, a transmission mode (a transmission method)) may be provided per BWP. Accordingly, according to a BWP/waveform indication, an uplink-related configuration which is configured in association with a corresponding BWP/waveform may be applied. For example, a waveform-specific BWP may be defined and utilized separately from a waveform-common BWP (i.e., the existing BWP). For waveform-specific BWP switching, compared to the existing BWP switching, a frequency position, a bandwidth, etc. may be configured/defined equally. For waveform-specific BWP switching, compared to the existing BWP switching, a BWP switching gap may be configured/defined differently. For example, a BWP switching gap may correspond to a time period for a preparation process from a BWP switching indication to a time when an operation on an indicated BWP starts. For waveform-specific BWP switching, compared to the existing (or general) BWP switching, a longer or shorter gap may be applied. For example, a BWP switching gap (or a waveform switching gap) may be configured/defined/applied according to complexity of a terminal's operation or according to whether a waveform is changed.

Embodiment 1-3

One of a plurality of types of waveforms may operate as a default waveform. A default waveform may be preconfigured through system information or higher layer signaling in an initial access step or may be predefined without separate signaling.

While basically operating based on a default waveform, a terminal may switch to another waveform when receiving a waveform switching indication (e.g., based on a MAC-CE or DCI). A terminal may operate for a predetermined time period based on a switched waveform. A predetermined time period may be predefined or preconfigured. When a predetermined time period expires, fallback may be performed by using a default waveform-based operation. For example, a default waveform may be DFT-s-OFDM and other waveform may be CP-OFDM.

A waveform other than a default waveform may be applied based on a timer. For example, when information (e.g., DCI or a MAC-CE) indicating a specific waveform (or scheduling corresponding waveform-based uplink transmission) is received, a timer related to application of a corresponding waveform may be (re)started. While a timer is running, a specific waveform may be applied to uplink transmission, and when a timer expires, it may be switched to a default waveform (or an initial, fallback, previous waveform) (without separate signaling/indication). If indication (or corresponding waveform-based scheduling) information on a waveform is received before a timer expires while running, a timer may be restarted. Alternatively, even when uplink scheduling information is received without an indication for a waveform before a timer expires while running, a timer related to application of a currently applied waveform may be restarted.

In examples of the above-described embodiments 1-2/1-3, when a waveform indication is provided through DCI, a terminal may transmit to a network acknowledgment (ACK/NACK) for DCI (or a PDCCH carrying corresponding DCI) in order for a terminal to confirm whether a waveform indication was successfully decoded from a network.

Embodiment 2

This embodiment relates to a method for clarifying an application time of waveform switching. For example, even when a network indicates waveform switching to a terminal according to various methods in Embodiment 1, for a time of application of a corresponding waveform (or uplink transmission based on a corresponding waveform), a problem may occur if a network does not match between terminals or is unclear.

When waveform switching for uplink transmission is possible, in order to support smooth waveform switching of a terminal and uplink transmission based thereon, a time gap (or offset), a switching time, etc. related to waveform switching may be predefined or predefined, or may be determined/calculated/applied based on a predefined/pre-configured rule/parameter.

Here, X and/or Y corresponding to a length of a time gap and/or a switching time may be expressed based on various time units (e.g., a symbol/a symbol group/a slot/a slot group, etc.) as described above.

Waveform switching for uplink transmission may be influenced by implementation of a wireless transmitting or receiving end of a terminal. Switching delay (or time) may vary depending on a variety of terminal implementations. Accordingly, the above-described time gap and/or switching time may be defined/configured/applied based on a capability of a terminal.

For example, with a capability of a terminal, it may be reported to a network that the minimum value of X, a length of a time gap for waveform switching, is 10 symbols. In this case, a terminal may not expect a network to configure a time gap related to waveform switching to be less than 10 symbols. The above-described examples may also include a case of X=0 and/or Y=0. In other words, a terminal may also apply a waveform change right after being indicated.

When such a time gap/a switching time is applied, ambiguity for an application time of waveform switching of a terminal may occur. To solve it, a network and a terminal may operate by performing/applying waveform switching according to the following timing relationship.

A timing relationship that a timing of receiving waveform switching (or activation/deactivation) indication information (e.g., a MAC-CE command or DCI) is t0 and an application time of an indicated (new) waveform is t0+X (or t0+Y) may be defined. Here, X (or Y) is a value which may be determined based on a capability related to waveform switching of a terminal.

As an additional example, when a timing of receiving waveform switching (or activation/deactivation) indication information (e.g., a MAC-CE command or DCI) is t0 and a time when ACK/NACK therefor is transmitted is t1, a timing relationship that an application time of an indicated (new) waveform is t1+Z may be defined. Here, a case of Z=0 is included.

Embodiment 3

This embodiment relates to a method in which an uplink power-related configuration is provided per waveform.

For example, an uplink power-related configuration may include a power control parameter set (e.g., the maximum value of uplink transmission power, an open-loop power control parameter (e.g., P0, alpha, etc.), a pathloss (PL) reference signal, etc.), a configuration related to power headroom report (PHR), etc. In other words, a power control parameter may be configured per waveform and/or PHR may be configured per specific waveform and reported to a network.

A PAPR property may vary depending on a waveform applied to uplink transmission. Considering it, a power control parameter set applied to uplink transmission may be configured per waveform.

As an additional example, a power control parameter set may be configured per BWP and similar to Embodiment 1-2, a BWP and a waveform may be associated. Accordingly, according to a BWP switching indication to a specific BWP, application of a waveform associated with a corresponding BWP may be indicated and application of a power control parameter set configured for a corresponding BWP may be indicated.

Among the above-described uplink power-related configurations or parameter sets, some may be commonly configured/applied to a plurality of waveforms and others may be individually configured/applied in a waveform-specific manner.

In order for a network to perform smooth closed-loop power control, a terminal may report a power headroom to a network. When PHR is configured per waveform, a network may receive PHR related to a corresponding waveform in advance before waveform switching. For example, a base station may configure PHR for a first waveform (e.g., PHR_CP_OFDM) and PHR for a second waveform (e.g., PHR_DFT_s_OFDM) to a terminal, respectively and a terminal may transmit to a base station PHR report based on a power control parameter configured for each waveform.

Embodiment 4

This embodiment relates to a method in which an uplink transmission-related configuration is provided per waveform. For example, a configuration for an uplink channel, a configuration for an uplink transmission method, etc. may be provided per waveform. To this end, a waveform identifier (e.g., waveform-id) may be defined and used.

For example, an uplink transmission-related configuration may include a configuration for a PUSCH (e.g., RRC information element PUSCH-Config), a configuration for configured grant (e.g., RRC information element ConfiguredGrantConfig), a configuration for Msg3/MsgA in a random access process (e.g., RRC information element RACH-Config, MsgA-PUSCH-Config), etc.

For example, a waveform identifier may be included in an uplink transmission-related configuration information element, and parameters in a corresponding information element may be configured to be applied to a waveform corresponding to a waveform identifier.

Alternatively, a waveform-common parameter and a waveform-specific parameter may be separately included in an uplink transmission-related configuration information element. Waveform-specific parameters may be associated with a waveform identifier. For example, waveform-specific parameters may include at least one of parameters related to the maximum rank value (e.g., maxRank), a size of a resource block group (e.g., rbg-Size), codebook/non-codebook-based uplink transmission (e.g., txConfig), coherence of a precoding matrix (e.g., codebookSubset) and an uplink power mode (e.g., ul-FullPowerTransmission).

As an additional example, when a waveform-specific higher layer parameter is configured as described above, while waveform switching is applied when a waveform change indication (e.g., a MAC-CE and/or DCI) is provided, only waveform-specific parameters may be updated.

Embodiment 5

This embodiment relates to a DCI format related to waveform switching.

DCI (e.g., DCI format 0 series) including information scheduling uplink transmission may include a SRS resource indicator (SRI) field, precoding information and the number of layers (hereinafter, a transmission precoding matrix indicator (TPMI) and a transmission rank indicator (TRI) field). A SRI field may have a different size according to the maximum number of SRS resources and a codebook/non-codebook-based transmission configuration. A TPMI and TRI field may have a different size according to a variety of configurations such as codebook/non-codebook-based transmission, an uplink power mode, whether transform precoding is applied, coherence of a precoding matrix, etc.

When a waveform indication is performed based on DCI as in Embodiment 1, a size of a SRI field and/or a TPMI and TRI field varies per waveform, so a size of a DCI format may vary. When there is ambiguity in a payload size of a DCI format, the burden of blind decoding of a terminal may increase. Accordingly, a DCI format including waveform indication information may be defined so that a size of a SRI field and/or a size of a TPMI and TRI field has a fixed value regardless of an indicated waveform (or although any waveform is indicated).

For example, for each of at least one specific field of a DCI format including waveform indication information, its size may be determined/defined based on the maximum value of a first size for a corresponding field to show information on a first waveform and a second size for a corresponding field to show information on a second waveform.

For example, a SRI field size may be defined as the maximum value of a SRI field size for a first waveform and a SRI field size for a second waveform.

For example, a TPMI and TRI field size may be defined as the maximum value of a TPMI and TRI field size for a first waveform and a TPMI and TRI field size for a second waveform.

For example, a size of a DCI format including waveform indication information (or a DCI format including a SRI field/a TPMI and TRI field for a first/second waveform) may be defined based on the maximum value of a size of a DCI format for a first waveform (or for supporting a first waveform) and a size of a DCI format for a second waveform (or for supporting a second waveform).

As an additional example, when a configuration, a transmission method, etc. for an available resource are predetermined per waveform, a size of DCI indicating switching to a specific waveform or DCI for uplink scheduling after switching to a specific waveform is completed/applied may be determined according to an available resource and a transmission method for the specific waveform.

For example, it may be assumed that the maximum rank of a DFT-s-OFDM waveform is configured as 1, the maximum rank of a CP-OFDM waveform is configured as 4 and a codebook-based transmission method is applied. A size of a TPMI and TRI field of DCI may be determined as 4 bits for DFT-s-OFDM and 6 bits for CP-OFDM.

When a waveform change from DFT-s-OFDM to CP-OFDM is completed, a size of a TPMI and TRI field of DCI scheduling uplink transmission may be determined as 6 bits.

If waveform switching from DFT-s-OFDM to CP-OFDM is indicated, but a waveform change is not completed yet, a size of DCI scheduling uplink transmission may be determined based on a configuration for a source waveform before switching (e.g., DFT-s-OFDM). Here, interpretation for a field of corresponding DCI may be based on a configuration for a target waveform after switching (e.g., CP-OFDM).

A size of DCI including an indicator for a waveform change may be also determined based on a configuration for a source waveform and interpretation of corresponding DCI may be based on a configuration for a target waveform.

For example, it may be assumed that a size of a specific field in DCI based on a configuration for a source waveform is larger than a size of a specific field in DCI based on a configuration for a target waveform. In this case, among the total number of bits in the specific field, only the number of some bits corresponding to a field size based on a configuration for a target waveform may be interpreted and applied. The number of some bits may be positioned in the most significant bit (MSB) or the least significant bit (LSB) of the total number of bits. The remaining bits may have a reserved value, may be padded with a value of 0 or may be ignored. For example, in DCI indicating a waveform change from CP-OFDM to DFT-s-OFDM, a TPMI and TRI field may have a 6-bit size based on a configuration for CP-OFDM. Based on a configuration for DFT-s-OFDM, only 4 bits of a TPMI and TRI field are meaningful. Accordingly, it may be assumed that uplink transmission is performed based on 4 bits among 6 bits of a TPMI and TRI field (a MSB or a LSB) and the remaining 2 bits are ignored or zero-padded.

For example, it may be assumed that a size of a specific field in DCI based on a configuration for a source waveform is smaller than a size of a specific field in DCI based on a configuration for a target waveform. In this case, a corresponding field may be interpreted and applied by assuming the total number of bits of the specific field and the additional number of bits thereof. The additional number of bits may be interpreted as being added to a MSB or a LSB of an indicated bit of a specific field. The additional number of bits may be interpreted based on (i.e., by borrowing) a value of some bits such as other field in corresponding DCI, other higher layer parameter (e.g., a master information block (MIB), a system information block (SIB), a specific parameter of a RRC message), etc. or may be interpreted as applying a value of a predefined or preconfigured bit. For example, in DCI indicating a waveform change from DFT-s-OFDM to CP-OFDM, a TPMI and TRI field may have a size of 4 bits based on a configuration for DFT-s-OFDM. Based on a configuration for CP-OFDM, 6 bits are needed to correctly interpret a TPMI and TRI field. Accordingly, it may be interpreted by assuming that there are 4 bits of a TPMI and TRI field, and further BB, additional 2 bits (e.g., predetermined value 00), at a MSB or LSB position of the 4 bits.

As an additional example, a DCI format including a waveform change indicator may be separately defined. A size of a corresponding DCI format may be defined as a fixed size regardless of a waveform. A corresponding DCI format may be CRC-scrambled by a new identifier (RNTI) and distinguished from an uplink scheduling DCI format.

Embodiment 6

This embodiment relates to validity of an uplink resource configured before waveform switching.

An uplink resource may include SRS/PUCCH/PUSCH resources, etc. These uplink resource candidates may be preconfigured, and a specific uplink resource may be indicated according to uplink scheduling.

Here, there may be ambiguity about whether an uplink resource (candidate) configured before a waveform change is assumed to be valid even after a waveform change.

Accordingly, according to a change from a first waveform to a second waveform, a terminal may expect that an uplink resource configured for a first waveform will be suspended and a new uplink resource related to a second waveform will be configured/indicated. When it is changed back to a first waveform, a configuration for a previously suspended uplink resource may be effectively applied.

It may be operated that, for a periodic resource or a semi-static resource, such uplink resource may be determined its validity according to a waveform change. For example, when a waveform change is completed, for smooth PUSCH scheduling for a terminal, a base station may re-trigger a SRS configuration proper to a changed waveform to a terminal and may provide a PUSCH configuration to a terminal after acquiring uplink channel information using a SRS resource determined accordingly.

If a specific uplink resource is configured as waveform-common, a corresponding resource may be always applied effectively regardless of whether a waveform is changed.

Figure 9:
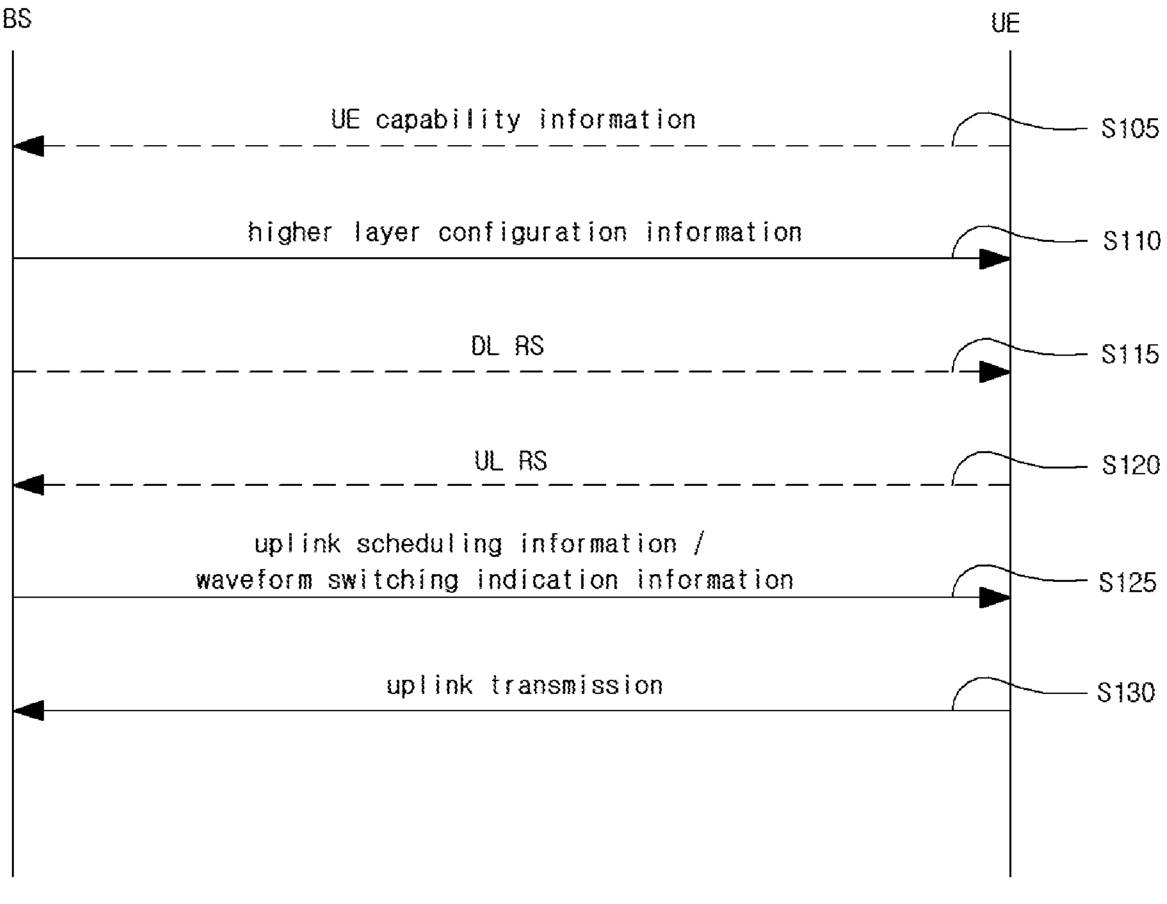
FIG. 9 is a diagram for describing a signaling process according to an embodiment of the present disclosure.

FIG. 9 is a diagram for describing a signaling process according to an embodiment of the present disclosure.

An example of FIG. 9 shows an example of signaling between a base station (BS) (or a network side) and a terminal (UE) for the above-described examples of the present disclosure (e.g., a combination of at least one of examples described in embodiment 1, 2, 3, 4, 5, 6 and detailed embodiments thereof). In an example of FIG. 9, a dotted line means that corresponding signaling may be omitted.

Figure 10:
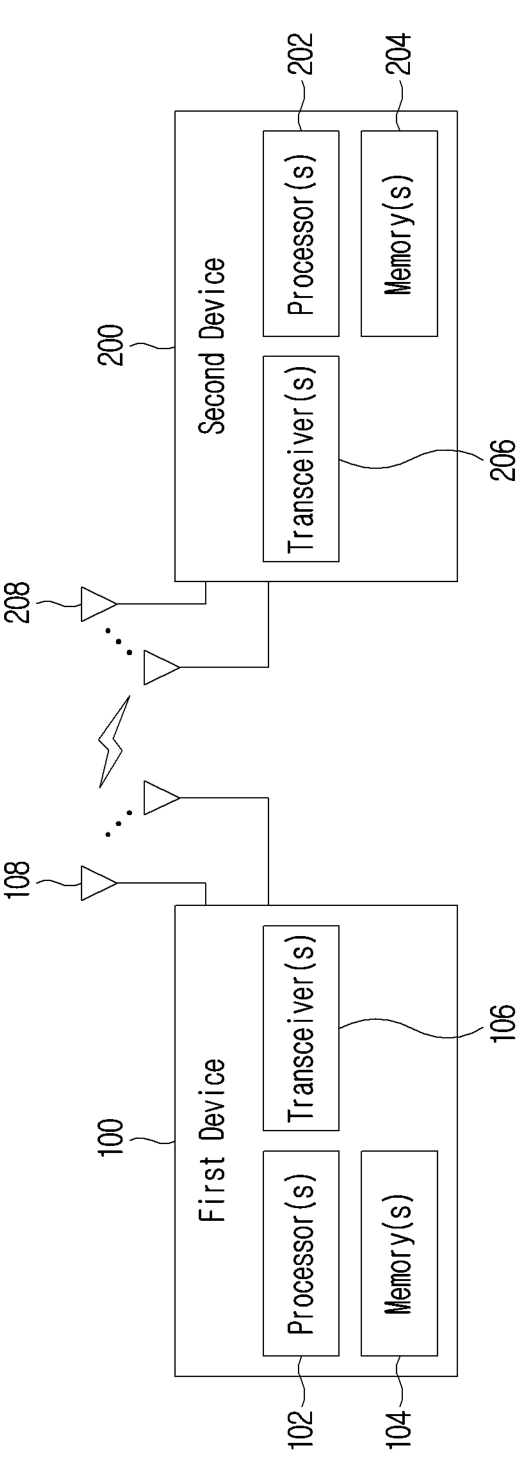
FIG. 10 is a diagram which illustrates a block diagram of a wireless communication device according to an embodiment of the present disclosure.

Here, UE/a network side is illustrative and may be applied by being replaced with a variety of devices as described by referring to FIG. 10. FIG. 9 is for convenience of a description, and it does not limit a scope of the present disclosure. In addition, some step(s) shown in FIG. 9 may be omitted depending on a situation and/or a configuration, etc. In addition, in an operation of a network side/UE in FIG. 9, the above-described uplink transmission or reception operation, etc. may be referred to or used.

In addition, a base station may generally mean an object which performs transmission or reception of data with a terminal. For example, the base station may be a concept including at least one transmission point (TP), at least one transmission and reception point (TRP), etc. In addition, a TP and/or a TRP may include a panel of a base station, a transmission and reception unit, etc.

In reference to FIG. 9, an example of UL-DL transmission or reception operation signaling between a terminal/a base station is described in detail.

A base station (BS) may receive UE capability information from a terminal (UE) S105. In other words, a terminal may transmit its capability information to a base station. For example, UE capability information may include a waveform switching time gap (or offset), the number of supported antenna ports, coherence (e.g., nonCoherent, partialNonCoherent, fullCoherent), a power mode (e.g., full power transmission), etc. When UE capability information is defined/promised in advance between a terminal and a base station, a corresponding step may be omitted.

A base station may provide a terminal with system information (SI), scheduling information, a CSI-related configuration (e.g., a CSI report configuration, a CSI-RS resource configuration, etc.), an uplink-related configuration (e.g., a PUSCH configuration (e.g. PUSCH-Config), a configuration for configured grant (e.g., ConfiguredGrantConfig), a configuration for Msg3/MsgA in a random access process (e.g., RACH-Config, MsgA-PUSCH-Config)) and/or a configuration for a waveform (e.g., waveform-common parameter(s) and/or waveform-specific parameter(s)), etc. through higher layer signaling (e.g., RRC or a MAC CE) S110. A terminal may receive SI, scheduling information, a CSI-related configuration, an uplink-related configuration, and/or a waveform-related configuration, etc. from a base station. In an example, information transmitted through a higher layer may be transmitted individually/independently.

A base station may transmit a DL RS (e.g., a SSB, a CSI-RS, a TRS, a PT-RS, etc.) to a corresponding terminal to acquire information about a downlink channel state S115. A terminal may receive a DL RS from a base station.

A base station may receive an UL RS (e.g., a SRS, etc.) from a corresponding terminal to acquire information about an uplink channel state S120. A terminal may transmit an UL RS to a base station. For example, an UL RS may be based on channel information calculated based on a DL RS in S115. In addition, a base station may receive the channel information with the RS.

A base station may transmit uplink scheduling information and/or waveform switching indication information, etc. to a terminal S125. A terminal may receive uplink scheduling information and/or waveform switching indication information, etc. from a base station. For example, uplink scheduling information and/or waveform switching indication information may include information about a SRI, a TPMI, a TRI, a MCS, etc.

A base station may receive an uplink channel/signal transmitted from a terminal based on the uplink scheduling information and/or waveform switching indication information S130. A terminal may transmit an uplink channel/signal to a base station based on the uplink scheduling information and/or waveform switching indication information. For example, after waveform switching is completed, an uplink channel/signal may be transmitted based on a changed waveform.

For example, in the above-described steps, an operation that a base station (100 in FIG. 10) transmits higher layer configuration information, a DL RS, uplink scheduling/waveform indication information, etc. to UE (200 in FIG. 10) or receives terminal capability information, an UL RS and an UL channel/signal from UE (200 in FIG. 10) may be implemented by a device in FIG. 10 which will be described below. For example, in reference to FIG. 10, at least one processor 102 may control at least one transceiver 106 and/or at least one memory 104, etc. to perform transmission or reception and at least one transceiver 106 may perform corresponding transmission/reception to/from UE.

For example, in the above-described steps, an operation that a terminal (200 in FIG. 10) receives higher layer configuration information, a DL RS, uplink scheduling/waveform indication information, etc. from a base station (100 in FIG. 10) or transmits terminal capability information, an UL RS and an UL channel/signal to a base station (100 in FIG. 10) may be implemented by a device in FIG. 10 which will be described below. For example, in reference to FIG. 10, at least one processor 202 may control at least one transceiver 206 and/or at least one memory 204, etc. to perform the transmission or reception and at least one transceiver 206 may perform corresponding transmission/reception to/from a base station.

As mentioned above, the above-described base station/terminal signaling and operation (examples of the present disclosure (e.g., a combination of at least one of examples described in embodiment 1, 2, 3, 4, 5, 6 and detailed embodiments thereof, FIGS. 7/8/9, etc.) may be implemented by a device (e.g., 100/200 in FIG. 10) which will be described below. For example, a BS may correspond to a first wireless device and UE may correspond to a second wireless device, and in some cases, the opposite case may be considered.

For example, the above-described base station/terminal signaling and operation (examples of the present disclosure (e.g., a combination of at least one of examples described in embodiment 1, 2, 3, 4, 5, 6 and detailed embodiments thereof, FIGS. 7/8/9, etc.) may be processed by at least one processor (102/202) in FIG. 10 and the above-described base station/terminal signaling and operation (examples of the present disclosure (e.g., a combination of at least one of examples described in embodiment 1, 2, 3, 4, 5, 6 and detailed embodiments thereof, FIGS. 7/8/9, etc.) may be stored in a memory (e.g., at least one memory (104/204) in FIG. 10) in a form of a command/a program (e.g., an instruction, an executable code) for driving at least one processor (e.g., 102/202) in FIG. 10.

General Device to which the Present Disclosure May be Applied

FIG. 10 illustrates a block diagram of a wireless communication device according to an embodiment of the present disclosure.

In reference to FIG. 10, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving, by a terminal from a network, downlink control information (DCI) including a transform precoder indication field, wherein the transform precoder indication field indicates whether the transform precoder is enabled or disabled; and performing, by the terminal, an uplink transmission based on the DCI, wherein, for the uplink transmission scheduled by the DCI, a transform precoding is enabled or disabled based on the transform precoder indication field in the DCI, wherein configuration information related to a power headroom report (PHR) is provided to the terminal, wherein the configuration information is related to an assumption that transform precoder is disabled or enabled for the PHR, wherein a portion of parameters related to the PHR is based on the assumption that the transform precoder is enabled, based on the transform precoder being disabled for the uplink transmission scheduled by the DCI.

2. The method according to claim 1, wherein:

other parameters related to the PHR except for the portion of parameters for the assumption are same as for the uplink transmission scheduled by the DCI.

3. A terminal comprising:

at least one transceiver; and at least one processor connected to the at least one transceiver, wherein the at least one processor is configured to:

receive, through the at least one transceiver, from a network, downlink control information (DCI) including a transform precoder indication field, wherein the transform precoder indication field indicates whether the transform precoder is enabled or disabled; and perform, through the at least one transceiver, an uplink transmission based on the DCI, wherein, for the uplink transmission scheduled by the DCI, a transform precoding is enabled or disabled based on the transform precoder indication field in the DCI, wherein configuration information related to a power headroom report (PHR) is provided to the terminal, wherein the configuration information is related to an assumption that transform precoder is disabled or enabled for the PHR, wherein a portion of parameters related to the PHR is based on the assumption that the transform precoder is enabled, based on the transform precoder being disabled for the uplink transmission scheduled by the DCI.

4. A base station comprising:

at least one transceiver; and at least one processor connected to the at least one transceiver, wherein the at least one processor is configured to:

transmit, to a terminal, through the at least one transceiver, downlink control information (DCI) including a transform precoder indication field, wherein the transform precoder indication field indicates whether the transform precoder is enabled or disabled; and receive, from the terminal, through the at least one transceiver, an uplink transmission based on the DCI, wherein, for the uplink transmission scheduled by the DCI, a transform precoding is enabled or disabled based on the transform precoder indication field in the DCI, wherein configuration information related to a power headroom report (PHR) is provided to the terminal, wherein the configuration information is related to an assumption that transform precoder is disabled or enabled for the PHR, wherein a portion of parameters related to the PHR is based on the assumption that the transform precoder is enabled, based on the transform precoder being disabled for the uplink transmission scheduled by the DCI.

5. The method according to claim 1, wherein:

a portion of parameters related to the PHR is based on the assumption that the transform precoder is disabled, based on the transform precoder being enabled for the uplink transmission scheduled by the DCI.

6. The method according to claim 1, wherein:

another configuration information related to the transform precoder for the uplink transmission is provided to the terminal;

the another configuration information is included in at least one of a physical uplink shared channel (PUSCH) configuration, configured grant configuration, random access message 3 configuration, or random access message A configuration.

7. The method according to claim 1, wherein:

the uplink transmission is a PUSCH transmission.

* * * * *